(12) United States Patent
Okamori et al.

(10) Patent No.: US 7,385,565 B2
(45) Date of Patent: Jun. 10, 2008

(54) PROJECTION-TYPE DISPLAY APPARATUS

(75) Inventors: Shinji Okamori, Tokyo (JP); Taketoshi Hibi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 626 days.

(21) Appl. No.: 10/670,321

(22) Filed: Sep. 26, 2003

(65) Prior Publication Data

US 2004/0125246 A1  Jul. 1, 2004

(30) Foreign Application Priority Data

Sep. 30, 2002  (JP) .............................. 2002-285078

(51) Int. Cl.
G09G 3/00 (2006.01)

(52) U.S. Cl. .......................... 345/32; 345/87; 359/371; 353/30

(58) Field of Classification Search ............ 345/30–32, 345/87; 359/225, 251, 355, 371, 386; 353/30
See application file for complete search history.

(56) References Cited

U.S. PATENT DOCUMENTS

| 5,056,912 | A | * | 10/1991 | Hamada et al. ............... 353/38 |
| 5,486,884 | A | * | 1/1996 | De Vaan ...................... 353/122 |
| 5,696,607 | A | * | 12/1997 | Yamana et al. ............. 358/474 |
| 6,128,127 | A | * | 10/2000 | Kusaka ....................... 359/371 |
| 6,592,224 | B2 | | 7/2003 | Ito et al. |
| 6,614,597 | B2 | * | 9/2003 | Mizouchi .................... 359/649 |
| 6,665,119 | B1 | * | 12/2003 | Kurtz et al. ................ 359/486 |
| 6,683,657 | B1 | | 1/2004 | Miyawaki |
| 6,727,937 | B1 | * | 4/2004 | Sukhanov et al. ............ 348/40 |
| 6,729,730 | B2 | | 5/2004 | Ito |
| 6,764,182 | B2 | | 7/2004 | Ito et al. |
| 6,992,718 | B1 | | 1/2006 | Takahara |
| 7,027,016 | B2 | | 4/2006 | Sakashita |
| 2001/0051763 | A1 | * | 12/2001 | Kurosawa et al. .......... 600/180 |
| 2002/0018184 | A1 | | 2/2002 | Ito |
| 2002/0126260 | A1 | * | 9/2002 | Edlinger et al. ............. 353/30 |
| 2003/0025845 | A1 | * | 2/2003 | Murakami et al. ............ 349/5 |
| 2003/0206337 | A1 | * | 11/2003 | Liang et al. ................ 359/352 |
| 2006/0187520 | A1 | * | 8/2006 | Bierhuizen .................. 359/247 |

FOREIGN PATENT DOCUMENTS

| JP | 1993-066501 | 3/1993 |
| JP | 2000-221461 | 8/2000 |

(Continued)

*Primary Examiner*—Richard Hjerpe
*Assistant Examiner*—Kimnhung Nguyen
(74) *Attorney, Agent, or Firm*—Birch, Stewart, Kolasch & Birch, LLP

(57) ABSTRACT

A projection-type display apparatus that has enhanced the sense of being present by adaptively adjusting, with a simple constitution, projection illumination, depending on an image signal, without causing color changes and by increasing apparent contrast. The projection-type display apparatus includes a light source, a liquid crystal light valve that modulates light emitted from the light source by turning its light polarization plane, and a projection lens that projects the light modulated by the liquid crystal light valve onto a projection surface, wherein a pivotable light polarizer is arranged between the light source and the liquid crystal light valve. The black level of an image is adjusted by adaptively pivoting the light polarizer in response to the image signal.

16 Claims, 15 Drawing Sheets

FOREIGN PATENT DOCUMENTS

| | | |
|---|---|---|
| JP | 2000-321993 | 11/2000 |
| JP | 2001-075529 | 3/2001 |
| JP | 2001-100699 | 4/2001 |
| JP | 2001-215613 | 8/2001 |
| JP | 2001-343611 | 12/2001 |
| JP | 2002-014660 | 1/2002 |
| JP | 2002-023106 A | 1/2002 |
| JP | 2002-031846 | 1/2002 |
| JP | 2002-090705 A | 3/2002 |
| JP | 2002-251171 | 9/2002 |
| WO | WO 01/55778 A1 | 8/2001 |

\* cited by examiner

X-Direction Shifting Distance of Light Shade (mm)

PROJECTION-TYPE DISPLAY APPARATUS

BACKGROUND OF THE INVENTION

This Nonprovisional application claims priority under 35 U.S.C. § 119(a) on Patent Application No(s). 2002-285078 filed in Japan on Sep. 30, 2002, the entire contents of which are hereby incorporated by reference.

1. Field of the Invention

The present invention relates to projection-type display apparatuses capable of adjusting projection illumination.

2. Description of the Related Art

Projection TVs, which project and display images, are well known as one example of video apparatuses that realize largescreen TVs. Among projection TVs, there are two typical types, those that magnify and project CRT images and those that utilize light valves such as liquid crystal panels. While the former CRT-type projection TVs have a technical problem that picture quality technically contradicts picture luminance, the latter light-valve-type projection TVs have recently been developed so as to overcome the technical problem of the former CRT-type projection TVs. The light-valve-type projection TVs have an essential advantage in compatibility between picture quality and picture luminance since they have, as systems independent of each other, a light source, and light valves for forming images. However, in comparison with CRT-type projection TVs, the light-valve-type projections TVs have, because of light leakage, disadvantages in the contrast, especially display of black color. For instance, there has been a problem that, since in video images in movies and the like which contain many dark scenes, black level cannot be displayed in high contrast, the images appear to have background luminance in their nominally black regions, which spoils the viewer's sense of being present.

To cope with these problems, projectors utilizing a mechanical light shutter for controlling the amount of light which illuminates the light valve have been proposed (see, e.g., Patent Document 1: Japanese Laid-Open Patent Publication No. 2002-23106 (p. 4-5, FIGS. 6-10) and Patent Document 2: Japanese Laid-Open Patent Publication No. 2002-90705 (p. 5-6, FIGS. 6-13)).

FIG. 12 is a plan view illustrating a projector described in Patent Documents 1 and 2. The projector shown in FIG. 12 is constituted from three principal parts including a light source unit 100, an illumination-optics unit 110 and a projection lens 120. Among them the illumination-optics unit 110 includes an integrator-optics system 111 and a color-separation/color-composition system 109. The integrator-optics system 111 includes a first lens array 112, a second lens array 113, a light shade 114 which acts as a light shutter, a polarization-conversion element 115 and a superposition lens 116. In FIG. 13, the configuration of the second lens array 113, the light shade 114, the polarization-conversion element array 115 and the superposition lens 116 is shown.

The light source unit 100 is provided with a light source lamp 101 and a concave mirror 102, radial light rays emitted from the light source lamp 101 are reflected by the concave mirror 102, and then emitted toward the first lens array 112 as approximately parallel light beams. The first lens array 112 has a matrix arrangement of a plurality of microlenses rectangular in contour, separating light emitted from the light source unit 100 into a plurality of partial light beams. The second lens array 113, being constituted from as many microlenses as those constituting the first lens array 112, functions to guide the plurality of partial light beams emitted from the first lens array 112 in such a way that the plurality of partial light beams is approximately condensed onto the polarization-separation element of the polarization-conversion element array 115. The polarization-conversion element array 115 is constituted from the polarization-separation element, which separates light emitted from the second lens array 113 into an S-polarization component and a P-polarization component, and a λ/2 phase difference plate that converts the polarization direction, and emits linearly polarized light by converting the polarization direction of an incident light beam.

The light shade 114 as a light shutter is arranged between the second lens array 113 and the polarization-conversion element array 115. The light shade 114, arranged opposite the incident light plane of the polarization-conversion element array 115, is a tabular body formed with alternating light reflection portions 117 that shut out light and have approximately the same width as that of the incident light and aperture portions 118 that allow light to pass through, as shown in FIG. 14. The light shade 114 is formed, in combination with a drive mechanism 119, so that the surface constituted from the light reflection portions 117 and the aperture portions 118 shifts in parallel to the incident light plane of the polarization-conversion element array 115 (X direction in FIG. 14), resulting in the incident light plane of the polarization-conversion element array 115 being openable and closable. That is, the amount of light entering the polarization-conversion element array 115 can be adjusted by shifting the light shade 114 in parallel. Since the polarization-conversion element array 115 is arranged just or proximately on the position where arc images of the light source form, the first lens array 112 is approximately in optically conjugate relationship with the incident pupil of the projection lens 120. This means that, even when light is shut out by the light shade 114 in the vicinity of the polarization-conversion element array 115, adjustment of brightness can be carried out without causing illumination non-uniformity, which is the same effect as the case with stopping-down the projection lens 120.

The foregoing method for adjusting the amount of light can raise the contrast of a displayed image and, especially, can be averted the problem that when a projected screen has a small size, background luminance in nominally black regions of the image makes the image brighter than necessary and the image is difficult to be watched.

SUMMARY OF THE INVENTION

There has been, however, a problem in that when the amount of light is adjusted by the light shade 114 disposed in the vicinity of the light source, changes in colors of illuminated light and projected light are unavoidable when adjusting the amount of light.

FIG. 15 is a view, drawn by computer simulation, of arc images of a light source, formed on the second lens array 113. Since a concave mirror, rotationally symmetric with respect to its light axis, is employed in the generally used light sources for projectors, the arc images of a light source present an approximately radial distribution with respect to its light axis as shown in FIG. 15A. In addition, since each arc image is of different size, and each differs from the other in the direction of its principal slope (major axis when each arc image is taken to be an ellipsoid), the proportion of each arc image shut out by shifting the aperture portions 118 of the light shade 114 is different depending on the arc image. Moreover, in fact, the arc images of the light source do not have exact rotational symmetry with respect to the light axis, and there are deviations in their intensity distribution. Furthermore, the shape of the arc images is not always stable but changes with time.

In this regard, arc images on the second lens array 113, with the light shade 114 being shifted, were sought through computer simulation. FIGS. 15B and 15C show partial arc images at certain time points with the light shade 114 being shifted. As shown in FIGS. 15B and 15C, the deviation in distribution becomes conspicuous when the arc images are partially shut off by shifting the light shade 114. It may be readily inferred that the chromaticity of each of the colors R, G, B and the chromaticity of a nominally white color composed of these colors R, G, B change because of the deviation in distribution of the arc images. In addition, color non-uniformity in a projected image may also occur. This is thought to be because the way in which the light shade 114 is shifted is only unilateral parallel-shifting.

The graph in FIG. 16 is a relationship, estimated through computer simulation, between X-direction shifting distance of the light shade 114 and change in the light amount. In FIG. 16, discrete data, interpolated into a smooth curve for convenience, is represented. In fact, however, when the light shade 114 is shifted, the amount of light changes nonlinearly or stepwise in accordance with a deviated distribution of the arc images of a light source. Moreover, since this curve differs from lamp to lamp, and the state of the arc image changes due to changes over time, it becomes necessary to find the curve lamp by lamp and then record data according to each of the lamps and the, changes over time, in a memory of the drive mechanism 119 that drives the light shade 114, which results in more complicated and costly apparatuses.

The present invention has been made in order to solve the foregoing problems, and it is an object of the invention to provide a projection-type display apparatus that gives a viewer a heightened sense of being present by adaptively adjusting, with a simple constitution, projection illumination depending on the image signal, without causing color changes such as color non-uniformity, and by increasing apparent contrast.

A projection-type display apparatus of the present invention includes a light source, a liquid crystal light valve that modulates the light emitted from the light source by turning a light polarization plane for the light, and a projection lens that projects the light modulated by the liquid crystal light valve onto a projection screen, wherein a pivotable light polarizer is arranged between the light source and the liquid crystal light valve.

BRIEF DESCRIPTION OF THE DRAWINGS

The present invention is illustrated by way of example and not by way of limitation in the figures of the accompanying drawings. In the accompanying drawings identical reference marks indicate identical elements.

DETAILED DESCRIPTION OF THE PREFERRED EMBODIMENTS

Preferred embodiments of the present invention are described in more detail below with reference to the accompanying drawings.

Embodiment 1

Figure 1:
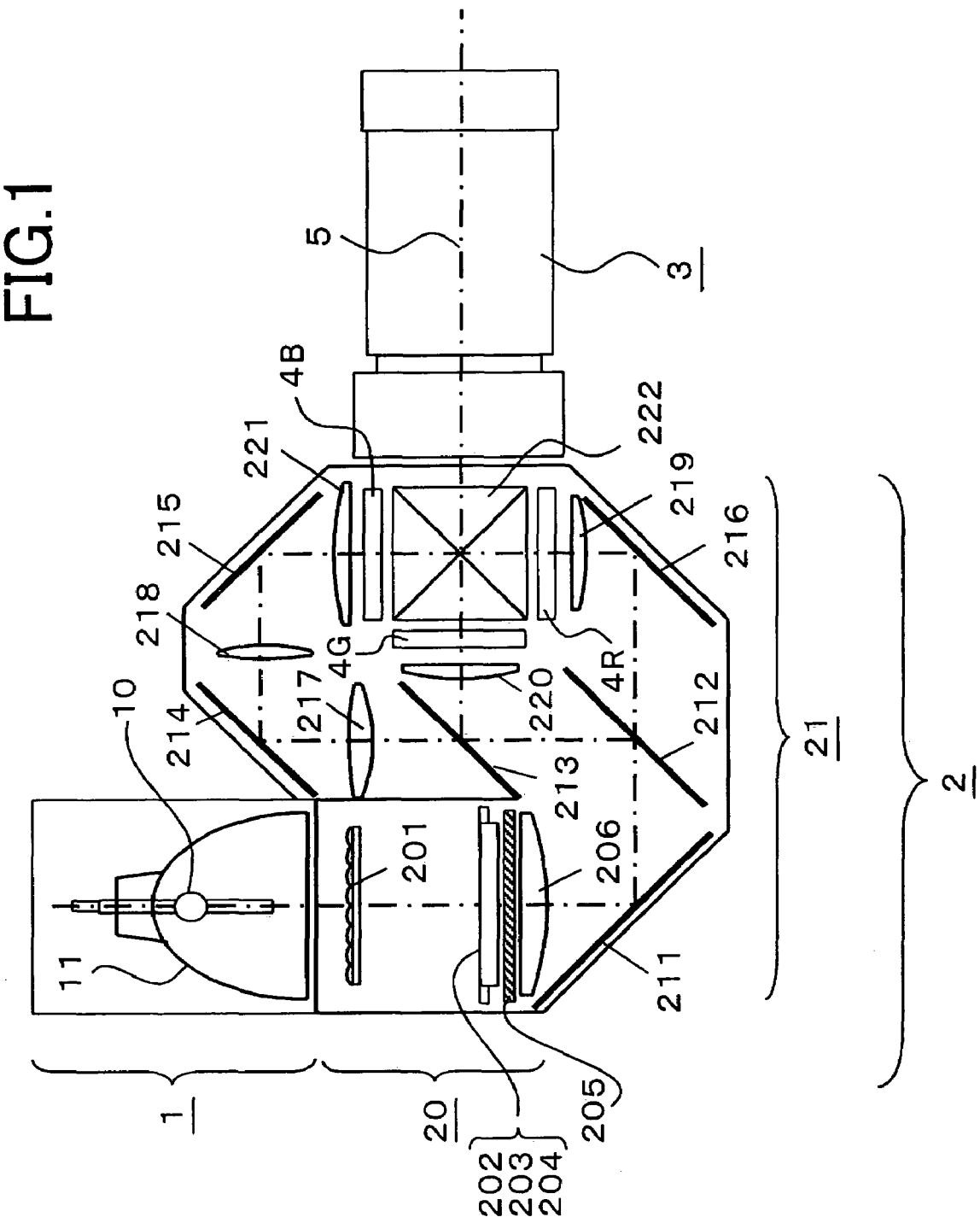
FIG. 1 is a plan view schematically illustrating the constitution of an optical system of a projection-type display apparatus involving Embodiment 1.

FIG. 1 is a plan view schematically illustrating the constitution of an optical system of a projection-type display apparatus related to Embodiment 1. The projection-type display apparatus is constituted from three principal elements, alight source unit 1, an illumination-optics unit 2 and a projection lens 3.

The light source unit 1 is provided with a light source lamp 10 and a concave mirror 11, and radiant beams emitted from the light source lamp 10 are reflected by the concave mirror 11, and then emitted toward the illumination-optics unit 2 as approximately parallel beams. As the light source lamp 10, it is preferable to use a halogen lamp, a metal halide lamp, an ultra-high pressure mercury lamp or a xenon lamp. As for the concave mirror 11, it is optimal to use a parabolic mirror or an ellipsoidal mirror. Although Embodiment 1 illustrates the case of a parabolic mirror, a combination of an ellipsoidal mirror and a concave lens may also be used so as to create approximately parallel beams that are suited to entering the illumination-optics unit 2.

The illumination-optics unit 2 is constituted from an integrator-optics system 20 and a color-separation/color-composition system 21. The integrator-optics system 20 receives the approximately parallel beams emitted from the light source unit 1, and then splits and superposes the beams in order to efficiently illuminate liquid crystal light valves 4R, 4G and 4G as objects of illumination. The liquid crystal light valves 4R, 4G and 4G modulate the beams emitted from the light source unit 1 by turning their light polarization planes. The integrator-optics system 20 will be described later.

The color-separation/color-composition system 21 includes a color separator for trichromatically separating the white light from the light source unit 1 into red, green and blue light, and a color composition unit for re-composing light of the three colors, modulated by the three liquid crystal light valves 4R, 4G and 4B that correspond to the trichromatically separated light. The color separator is constituted from dichroic mirrors 212 and 213. In FIG. 1, the dichroic mirror 212 transmits only the red light out of the white light, reflecting both the blue light, which is then transmitted by the dichroic mirror 213, and the green light, which is then reflected by the dichroic mirror 213. The color composition unit is a cross dichroic prism 222. In addition, the color-separation/color-composition system 21 includes reflection mirrors 211, 214, 215, 216; field lenses 219, 220, 221; and relay lenses 217, 218.

The light emitted from the color-separation/color-composition system 21 enters the projection lens 3, whereby an image is projected onto a projection plane after being magnified. Additionally, the field lenses 219, 220, 221; relay lenses 217, 218; the projection lens 3; and a condenser lens 206 that will be described later; are arranged in such a way that their optical axes coincide (shown as an optical axis 5 in FIG. 1).

The integrator-optics system 20 arranged in the illumination-optics unit 2 is constituted from a first lens array 201, a second lens array 202, a shading member 203, a polarization-conversion element array 204, a grid polarizer unit 205, and the condenser lens 206, in that order, and conducts light into the following-stage color-separation/color-composition system 21.

The first lens array 201, which is known as a fly's eye integrator, is constituted from a plurality of microlenses with rectangular contours, arranged in matrix form in order to uniformly illuminate the liquid crystal light valves 4R, 4G and 4G, and splits the light emitted from the light source unit 1 into a plurality of partial beams corresponding to the microlenses.

Figure 2:
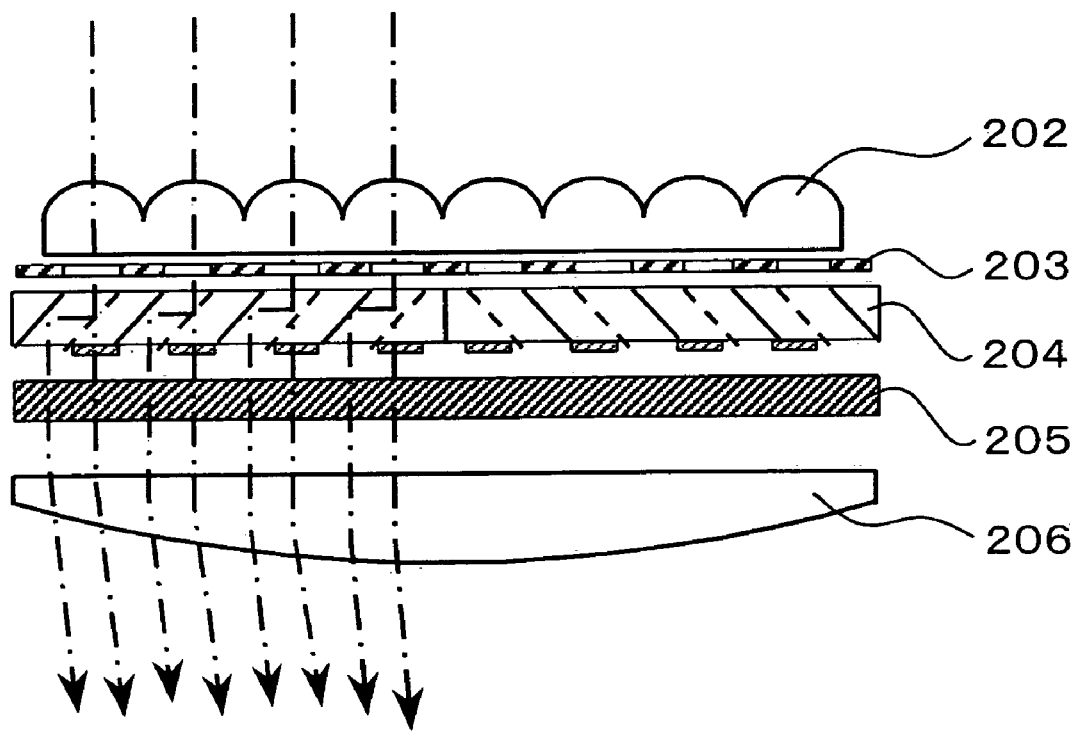
FIG. 2 is a magnified schematic view of a second lens array, a shading member, a polarization-conversion element array, a grid polarizer unit and a condenser lens of Embodiment 1.

FIG. 2 is a magnified view of the second lens array 202, the shading member 203, the polarization-conversion element array 204, the grid polarizer unit 205 and the condenser lens 206. The second lens array 202 is constituted from substantially as many microlenses as those constituting the first lens array 201. The orientation in which the convexity of the microlenses in the first lens array 201 is directed may be either the same as or opposite that of the orientation in which the convexity of the microlenses in the second lens array 202 is directed, so long as the orientation in either case is perpendicular to the incident light path.

The polarization-conversion element array 204 is constituted from a polarization-separation element, which is a so-called polarization beam splitter array that separates non-polarized natural light emitted from the second lens array 202 into two kinds of polarized light, P-polarization light (whose electric field vector is parallel to the incident plane of the polarization-conversion element array 204) and S-polarization light (whose electric field vector is perpendicular to the incident plane of the polarization-conversion element array 204); and a phase difference element that is arranged on the emitting side of the polarization beam splitter array and orientates the polarization directions of the two kinds of polarized light into either one of the two polarization directions, and then emits the light as linearly polarized light. Since the polarization-conversion element array 204 separates natural light into two kinds of polarized light that it outputs by orientating the two kinds of polarized light into one or the other of the polarization directions, light utilization efficiency can be raised. In addition, as the polarization-conversion element array 204, any polarization-conversion element other than those with the constitution described above can also be used so long as it re-emits polarized light emitted from the light source unit 1 after orientating the polarization planes of the light into a single direction.

The second lens array 202 described above is arranged in such a way as to approximately condense the plurality of partial beams, which are split by the first lens array 201, onto the beam splitter array of the polarization-conversion element array 204 so that a plurality of micro-arc images of the light source is formed thereon. The shading member 203 is fixedly arranged on the incident side of the polarization-conversion element array 204 in such a way that light enters through only the incident-light surface corresponding to the polarization beam splitter of the polarization-conversion element array 204, that is, in such a way that any light other than that forming micro-images of the light source images is shut out, so that the polarization directions of the two kinds of polarized light can be efficiently oriented into a single direction.

As shown in FIGS. 1 and 2, the grid polarizer unit 205 is arranged on the emitting side of the polarization-conversion element array 204.

Figure 3:
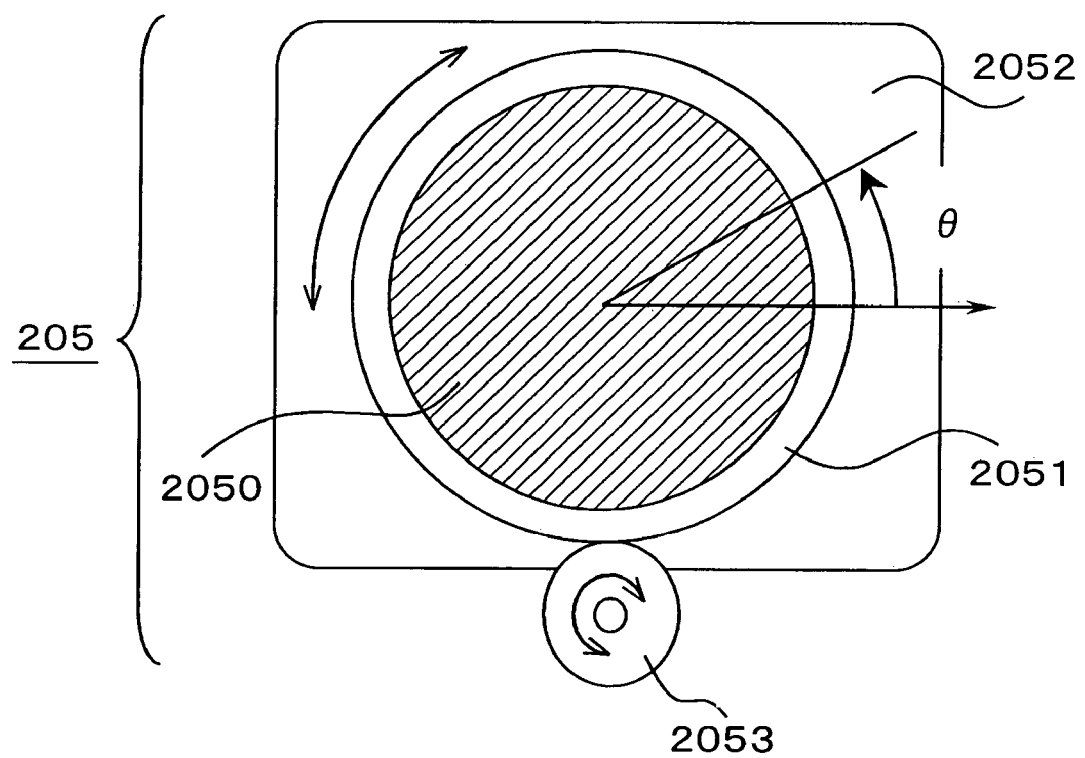
FIG. 3 is a magnified view of the grid polarizer unit, as viewed from an optical axis, of Embodiments 1 through 3.

FIG. 3 is a magnified view of the grid polarizer unit 205, as viewed along the optical axis 5. The grid polarizer unit 205 is constituted from a combination of a grid polarizer 2050, a holder 2051, a guide 2052 and a drive control unit 2053 (for example, a gear and a motor). The circumferential portion of the grid polarizer 2050 is held by the holder 2051, which is pivotable, along the guide 2052, with respect to the optical axis 5. The drive control unit 2053 is connected to the holder 2051 and capable of pivoting the holder 2051 through an arbitrary angle. Further, the pivotal center of the grid polarizer 2050 need not coincide with the optical axis 5.

The incident plane of the grid polarizer 2050 of the grid polarizer unit 205 is arranged approximately perpendicular to the optical axis 5, and the grid polarizer 2050 is pivoted through a desired angle and then stopped. Assuming that in this situation the effective plane of the grid polarizer 2050 transmits almost all incident light, then for example, when the incident light is S-polarization light, with the position of the grid polarizer 2050 whereat the transmission of the S-polarization light is maximized as a reference position, the pivotal angle $\theta$ in FIG. 3 is defined to be 0 degrees. Next, if the pivotal angle $\theta$ is increased by pivoting the grid polarizer 2050, the S-polarization component that is transmitted by the grid polarizer 2050 decreases gradually. When the pivotal angle reaches 90 degrees, the S-polarization component that is transmitted by the grid polarizer 2050 becomes zero. In other words, the intensity of the S-polarization light that is transmitted by the grid polarizer 2050 is proportional to $\cos \theta$. If for instance, the S-polarization light transmitted by the grid polarizer 2050 is desired to be half as intense as is the case with the reference position, the pivotal angle may be set at 60 degrees. Thus the pivotal angle, which is varied by the drive control unit 2053, can cover the whole range of dimming adjustment if the pivotal angle can be varied just by 90 degrees. However, the pivoting direction of the grid polarizer 2050 may be, in consideration of ease of pivoting by the control unit 2053, different every time (clockwise and counter-clockwise), or always the same direction (a single direction, either clockwise or counter-clockwise).

Figure 4A:
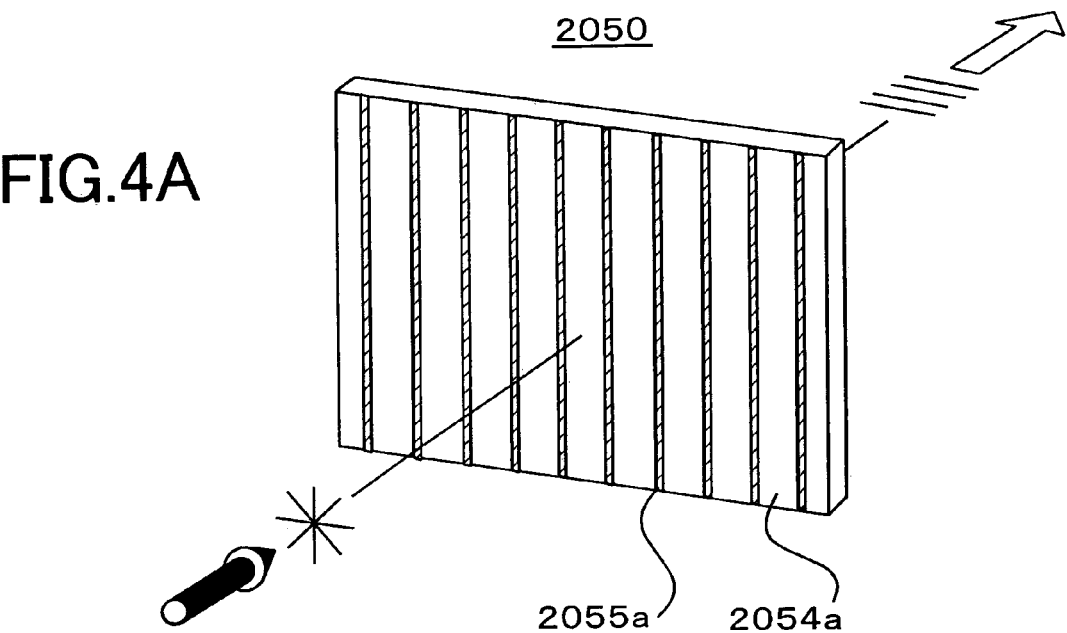
FIG. 4 is an explanatory view for describing a polarization-selection function of the grid polarizer unit of Embodiments 1 through 3.

As the grid polarizer 2050, as shown in FIG. 4A for example, a stripe-structured grid polarizer can be used, which is constituted from a base member 2054a made up of a dielectric in parallel-plate form, and a plurality of thin linear elements 2055a (several nanometers in width) that is made of metal and arranged on the surface of the base member 2054a at a predetermined spacing (pitch) to alternate with portion of the base member 2054a having a width of several hundred nanometers. By means of the grid polarizer 2050 as described above, among incident light rays, components polarized in the extending direction of the grid are not transmitted, whereas components polarized in the direction perpendicular to the extending direction are transmitted. The arrows and symbols in FIG. 4A symbolically represent incident light and a transmitted polarization component. Because of this property, the grid polarizer 2050 can efficiently yield an 80 to 90% transmittance and several-hundred-to-one dimming ratio in the visible light region., In addition, being constituted from a combination of metal and a dielectric material, the grid polarizer 2050 has high heat resistance and exhibits a very long lifespan in comparison with sheet polarizers made of organic materials. The properties are advantageous when the grid polarizer 2050 is arranged in the vicinity of the polarization-conversion element array 204, where energy density locally is large because of the arc images of the light source formed therein.

Figure 4B:
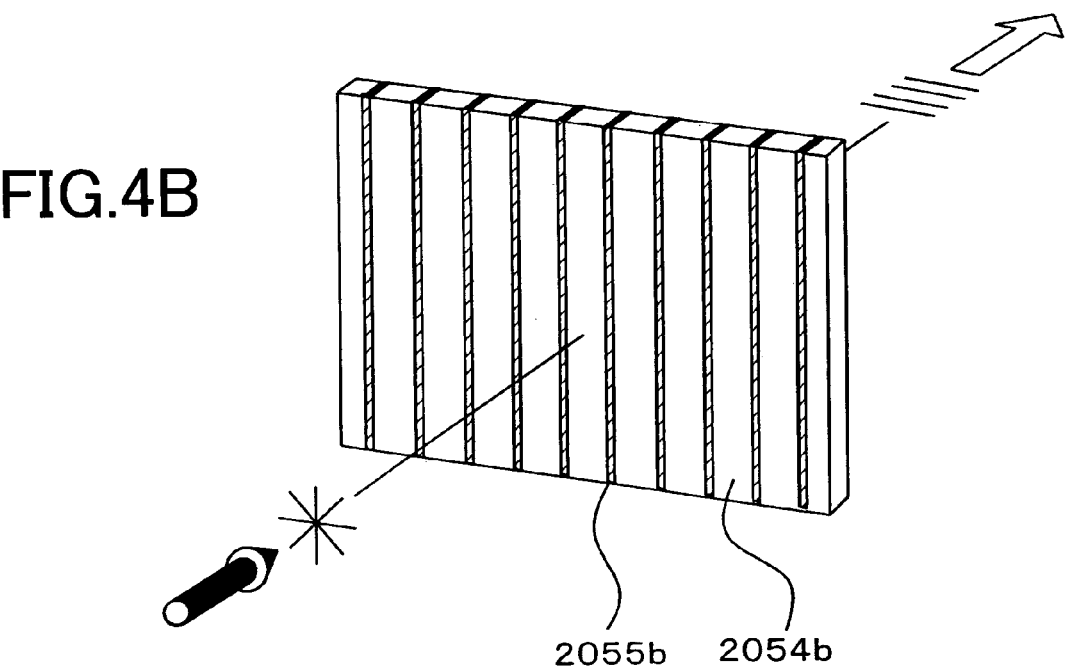

The grid polarizer 2050 as described above is produced principally through photolithography technology. A laminated type of polarizer as shown in FIG. 4B produced, utilizing microscopic film deposition technology, from a base member 2054b made of dielectrics in parallel-plate form and metal films 2055b may also be used. Taking cost into account, the stripe-structured grid polarizer 2050 shown in FIG. 4A is preferable, and as an example of a type in which thin lines of aluminum are coated on a glass substrate, Moxtek Inc.'s "ProFlux" (registered trademark) is appropriate.

By means of the grid polarizer unit 205 described above, the black level of an image can be improved by controlling the brightness of a projection-type display apparatus regardless of deviation in the distribution and changes over time of arc images of a light source, which are formed in the vicinity of the polarization-conversion element array 204. Moreover, the grid polarizer 2050 can readily be employed without significantly affecting the design of the illumination-optics unit 2, since the grid polarizer 2050 can be formed with parallel-plane plate approximately one mm in thickness.

Figure 5:
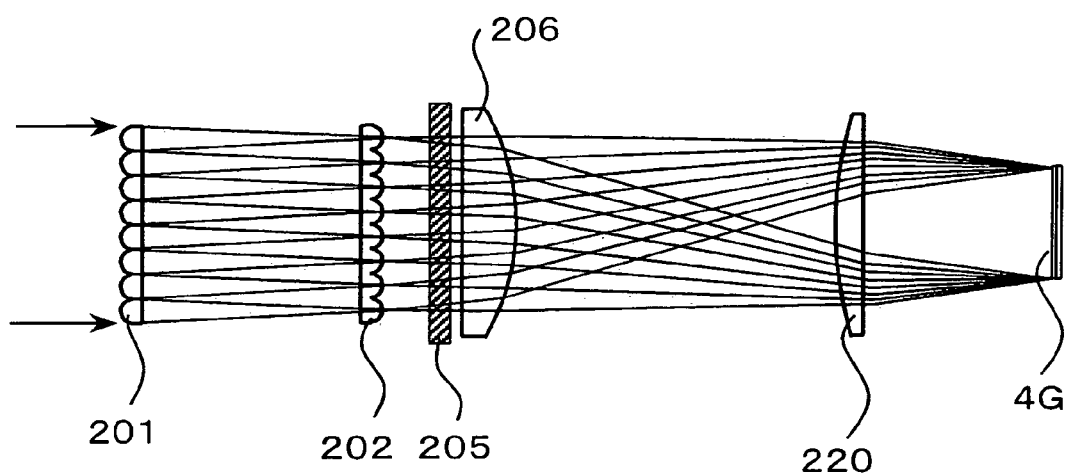
FIG. 5 is an explanatory view for describing the operation of an illumination-optics unit of Embodiment 1, uniformly illuminating a liquid crystal light valve as an illuminated plane.

FIG. 5 is an explanatory view for describing the operation of the illumination-optics unit 2 that uniformly illuminates liquid crystal light valves 4R, 4G and 4G as illumination planes, illustrating a light path of green light out of the three light paths shown in FIG. 1. In addition, the constitution including the first lens array 201, the second lens array 202, the grid polarizer unit 205, the condenser lens 206, the field lens 220, and the liquid crystal light valve 4G for green light are illustrated extracted in FIG. 5, whereas other constituent elements are omitted for simplicity. In FIG. 5, straight lines passing through each constituent element schematically illustrate the behavior of the light.

As shown in FIG. 5, the first lens array 201 and the second lens array 202 are arranged respectively in such a way that the first lens array 201 splits light emitted from the light source unit 1 into a plurality of partial beams, and the second lens array 202 approximately condenses the plurality of partial beams onto the polarization beam splitter array of the polarization-conversion element array 204 so that a plurality of arc images of the light source is formed thereon. The condenser lens 206 is arranged in such a way as to connect the rectangular apertures of the first lens array 201 with a plane in the vicinity of the liquid crystal light valve 4G in an optically conjugate relationship, and light emitted from the condenser lens 206 forms superimposed images of the rectangular apertures, through the field lens 220, in the vicinity of the liquid crystal light valve 4G.

Described above is a principle of uniform illumination, and although the light path of green light is described in FIG. 5, the same principle also applies to both the red light path as well as the blue light path. That is, a beam that enters the first lens array 201 typically has spatially non-uniform intensity distribution; however, by firstly splitting the beam into a plurality of partial beams through the first lens array 201, the intensity of illumination when the liquid crystal light valves 4R, 4G and 4B are illuminated through the condenser lens 206 that superimposes the partial beams can be made uniform in the illumination plane (uniformity of illumination). In addition, since the rectangular apertures of the first lens array 201 substantially define illumination areas on the liquid crystal light valves 4R, 4G and 4G, efficiency and uniformity of illumination can be controlled by adjusting the aspect ratio and size of the apertures.

It is preferable to arrange the grid polarizer unit 205 between the polarization-conversion element array 204 and the liquid crystal light valves 4R, 4G and 4B, and especially in the vicinity of the polarization-conversion element array 204. This arrangement is effective in terms of having the least adverse effect on the uniformity of illumination, when the relationship to forming images in the illumination-optics unit 2 is taken into account. In addition, as seen manifestly in FIG. 5, since the distribution of angles at which incident light enters the grid polarizer unit 205 can be made small, the dimming action described above can also be efficiently carried out. Moreover, because the angle of incident light with respect to the optical axis 5, can be found from the focal length and the aperture diameter of a microlens (diagonal length of a microlens, since the aperture can be approximated as a rectangular aperture) of the first lens array 201, it will generally be 10 degrees or less.

Figure 6:
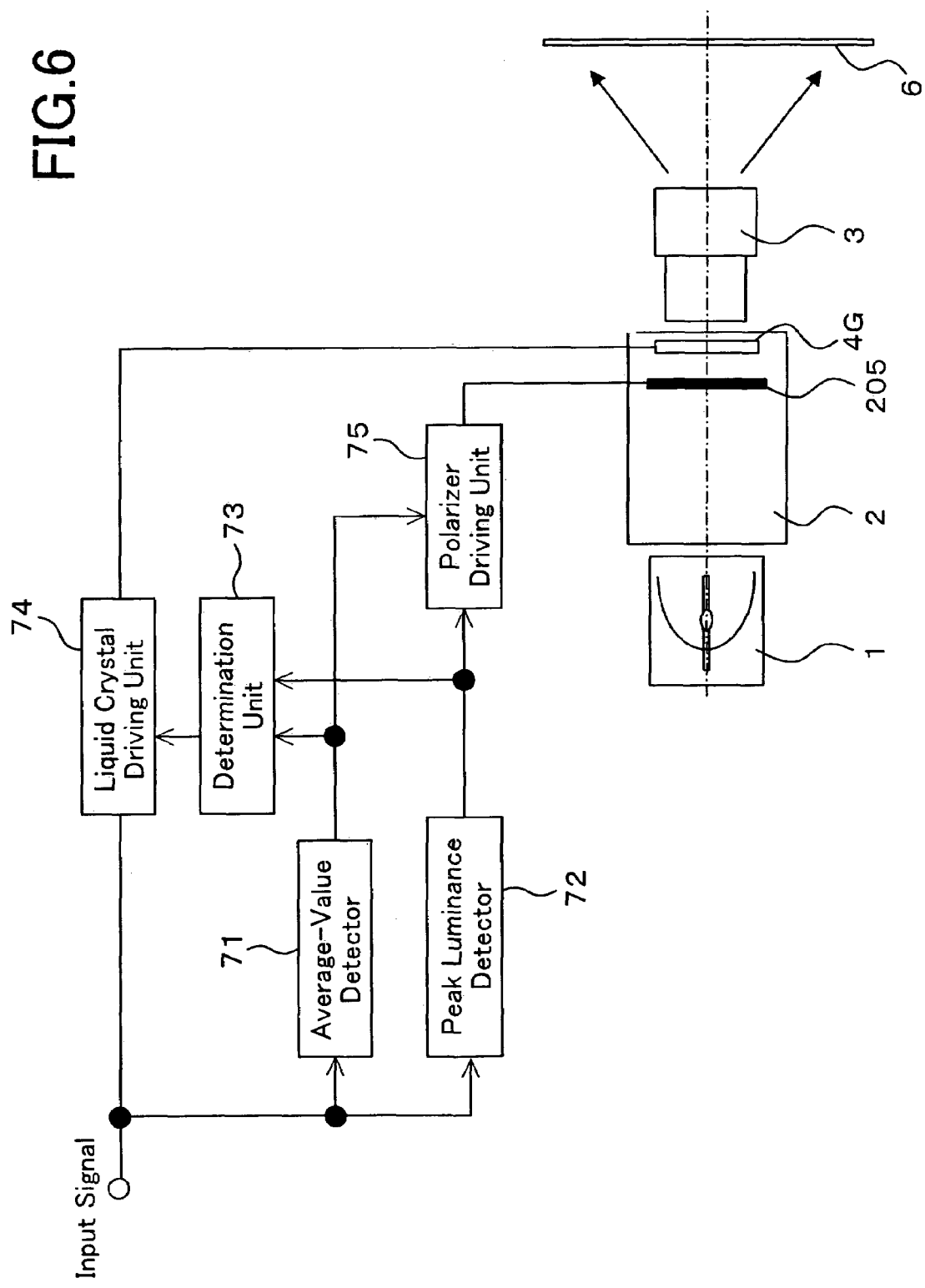
FIG. 6 is a block diagram illustrating an example of a projection-type display apparatus that includes a grid polarizer unit.

In regard to a projection-type display apparatus that includes the grid polarizer unit 205, an example of particular driving method will be explained with reference to the block diagram shown in FIG. 6. FIG. 6 represents the case with the liquid crystal light valve 4G, and the constitution of the optical system in the projection-type display apparatus is abbreviated in the illustration. An input image signal is input to an average-value detector 71 and a peak luminance detector 72, and the average luminance value in a frame and the peak luminance value in the frame are respectively detected. To drive the grid polarizer unit 205, a polarizer driving unit 75 determines the pivotal angle for the grid polarizer unit 205 based on the average luminance value and the peak luminance value that are output from the average value detector 71 and the peak luminance detector 72, so that provision is made for carrying out appropriate adjustment for light attenuation in response to the image. In addition, the average luminance value and peak luminance value are input also into a determination unit 73, so that determination of whether or not luminance value should be altered, on a frame basis based on the average luminance value and the peak luminance value, is implemented. The result of the determination is input into a liquid crystal driving unit 74, and thus when the result dictates alteration of luminance value, luminance value is altered in the liquid crystal driving unit 74 on a per-pixel basis in the frame. Thereafter, the liquid crystal light valves 4R, 4G and 4B are driven by the liquid crystal driving unit 74, so that an image with higher contrast can be displayed on the screen 6 as the projection plane.

Figure 7A:
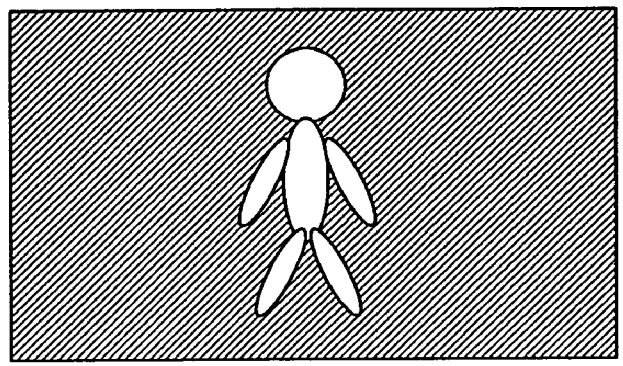
FIG. 7 is an explanatory view for describing the driving method of Embodiment 1.
Figure 7B:
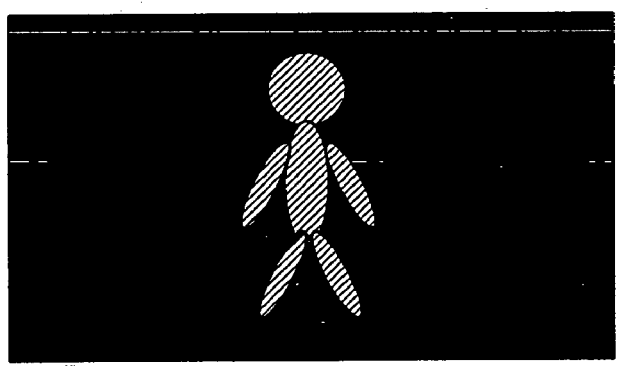
Figure 7C:
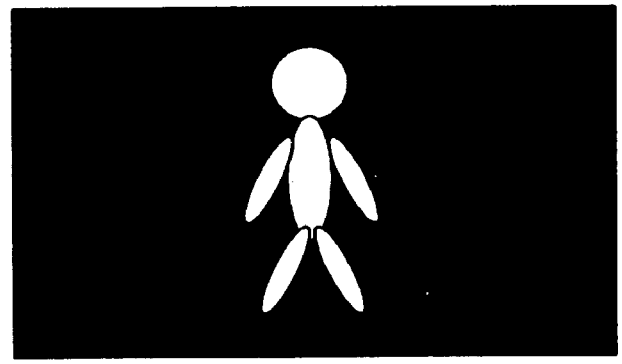

The determination procedure in the determination unit 73 described in FIG. 6 is illustrated with reference to FIG. 7. When an input image is, e.g., a dark scene on average, as illustrated in FIG. 7A, it is determined, based on the average luminance value that is detected by the average value detector 71, that there are many dark regions in the scene (determination 1). On this occasion, after the peak luminance value has been detected by the peak luminance detector 72, it is determined whether or not the peak luminance value is under the maximum allowable signal level of the liquid crystal light valves 4R, 4G and 4B, and whether or not the peak luminance value has a predetermined margin in comparison with the average luminance value (determination 2). Light attenuation by driving the grid polarizer unit 205 based only on the result of determination 1 by the average value detector 71 would result in darkening even bright regions, as illustrated in FIG. 7B. In this case, however, when it is determined through determination 2 that the peak luminance value is under the maximum allowable signal level of the liquid crystal light valves 4R, 4G and 4B, and has a predetermined margin in comparison with the average luminance value, the luminance value of the input image signal is altered on a per-pixel basis in the frame. Accordingly, the dynamic range of the luminance value of an input image signal can be magnified, i.e., the contrast of a projected image can be raised as shown in FIG. 7C. In the FIG. 7 case, alteration of luminance value can be carried out by amplifying the part of the input image signal corresponding to pixels that nominally have signal levels as bright regions, so that the brightness levels of the pixels become approximately the same as the nominal brightness levels of the input image signal. This can be realized by multiplying, by a coefficient, the difference between the luminance value of each pixel and the peak luminance value of the frame to which each pixel belongs.

Although the determination reference described above depends on how an image actually looks and on the range in which compensating by amplification is possible, the predetermined margin in comparison with the average luminance value, the coefficient to be multiplied, or the like can be adjusted using various kinds of images. In addition, by exerting the light dimming action on input images of low-luminance, e.g., near the minimum gradation level, a display wherein background luminance in nominally black regions is suppressed without also lowering the relative brightness of the input image in the other bright regions is made feasible, so that not only the actual numerical value but also the subjective sense of contrast can be heightened. It should be understood that the determination by the determination unit 73 can be constituted by software.

Any light valves that modulate the light emitted from the light source unit 1 by turning their light polarization planes can be used as the liquid crystal light valves 4R, 4G and 4B; and liquid crystals such as, for instance, nematic, smectic, cholestic and other liquid crystals can be enumerated. In addition, the orientation states of the liquid crystal molecules that constitute the liquid crystal light valves may be twisted, hybrid, homeotropic, homogeneous, and bent orientations or the like.

In the case of the projection-type display apparatus in this embodiment, a transmission-type liquid crystal display device, e.g., a TFT-TN (thin film transistor-twisted nematic) liquid crystal panel is optimum. Moreover, because the grid polarizer unit 205 in this embodiment is arranged at the position where uniformity of illumination in the illumination-optics unit 2 is scarcely affected, the same result can also be achieved using reflection-type liquid crystal display elements, e.g., LCoS (liquid crystal on silicon) as the liquid crystal light valves 4R, 4G and 4B, so long as the substantive color-separation/color-composition system 21 is optimized in line with the action of the reflection-type liquid crystal display device. In addition, although a case in which three liquid crystal light valves 4R, 4G and 4B are used has been described, a single, two, four or more may be used, and the same result can be achieved so long as the illumination-optics unit 2 is constituted from elements each of which is optimized. Furthermore, embodiments of a projection-type display apparatus are not limited to the front-projection type illustrated in FIG. 1, and a rear-projection type can also be realized by combining it with appropriate mirrors, a screen, and a cabinet.

Additionally, although the case in which the light incident plane in the grid polarizer unit 205 is situated approximately perpendicular to the light path has been described, this is because the grid polarizer 2050 that constitutes the grid polarizer unit 205 is a transmission-type polarizer (i.e., its incident angle is 0 degrees); therefore, with a deflection-type polarizer, it may be situated in accordance with the incident angle that the grid polarizer 2050 covers.

Moreover, although the case in which the polarization-conversion element array 204 and the grid polarizer unit 205, in order to raise light-utilization efficiency, are arranged in that order from the light source 1, has been described, the grid polarizer unit 205 may be arranged closer than the polarization-conversion element array 204 to the light source unit 1. In the latter case, however, since images as a whole are likely to be displayed darker because of lower light-utilization efficiency, applications of the latter case should be limited to movies or the like that include many dark images. Additionally, if both applications limited to movies and the like with many dark images, and reduction in the number of components are required, a constitution in which no polarization-conversion element array 204 is arranged may be possible. Even in this case, by arranging the grid polarizer unit 205 between the light source unit 1 and the liquid crystal light valves 4R, 4G and 4B, provision is made for adjusting the amount of light by the combination of the grid polarizer unit 205 and the liquid crystal light valves 4R, 4G and 4B that turn their light polarization planes.

Embodiment 2

Figure 8:
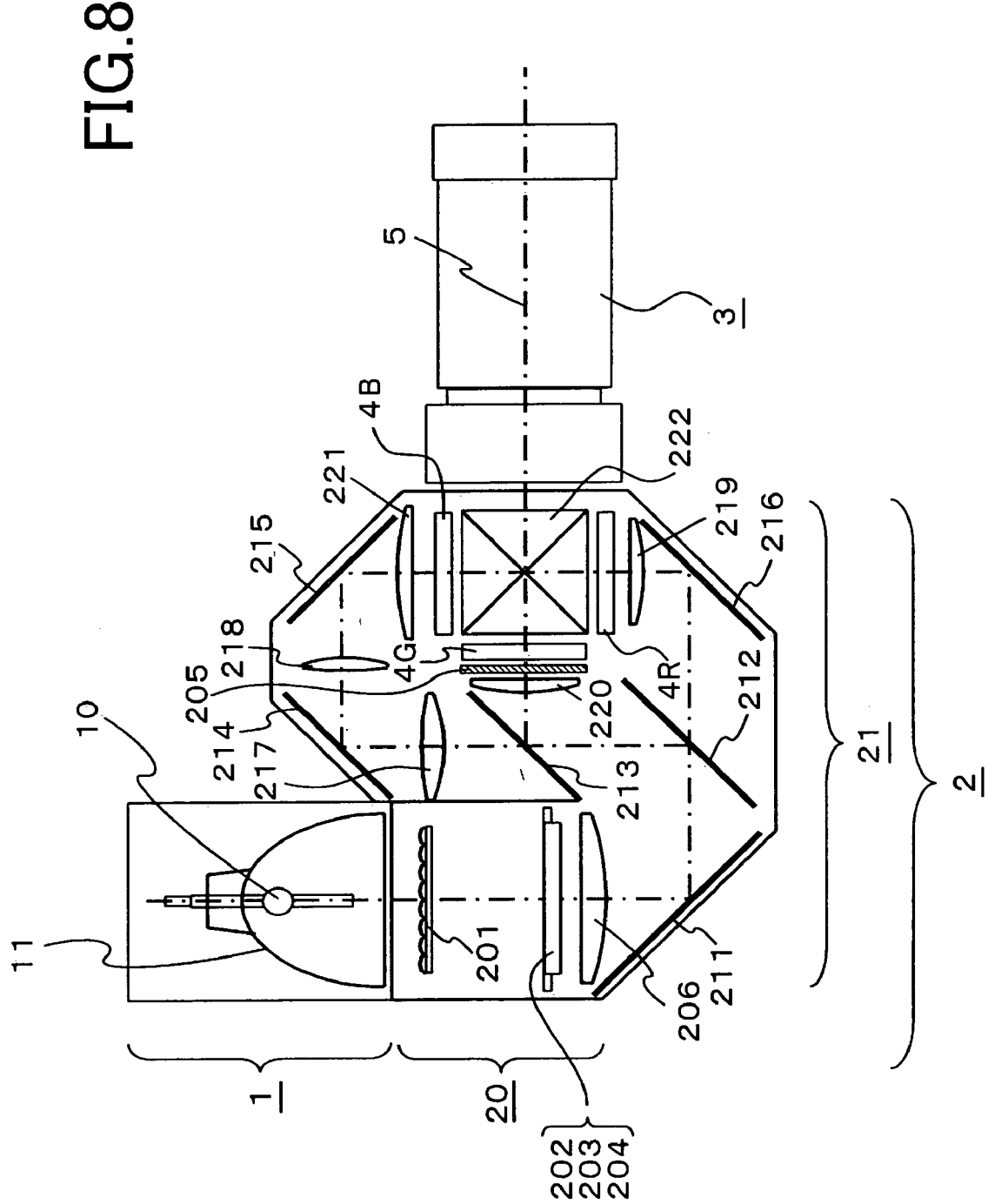
FIG. 8 is a plan view for schematically illustrating the constitution of an optical system of a projection-type display apparatus involving Embodiment 2.

FIG. 8 illustrates the particular constitution of a projection-type display apparatus according to embodiment 2. In Embodiment 2, what is distinguished from Embodiment 1 is the fact that the grid polarizer unit 205 is arranged between the field lens 220 that is in the path of the green light emitted from the dichroic mirror 213 as a color separator, and the liquid crystal light valve 4G.

In Embodiment 1, a discharge lamp is used as a light source, but mercury-lighting-based lamps such as a metal halide lamp or an ultrahigh pressure mercury lamp have the largest intensity in green light out of the light of the three colors, i.e., red, green and blue, that composes white light. For example, as far as relative intensity of the light of each color is concerned, that of green light typically tends to be several times larger than that of the light of the other colors after a white-balance adjustment has been implemented to suite TV display. In addition, when the fact that human visible sensitivity has its peak in green light is taken into account, black color is very often likely to look slightly greenish while a projection-type display apparatus is displaying the black color (greenish tendency). Therefore, not only efficient dimming adjustment can be carried out by arranging the grid polarizer unit 205 solely in the path of green light, but the effect that the black-color display quality is subjectively raised can be obtained by suppressing the greenish tendency.

Figure 9:
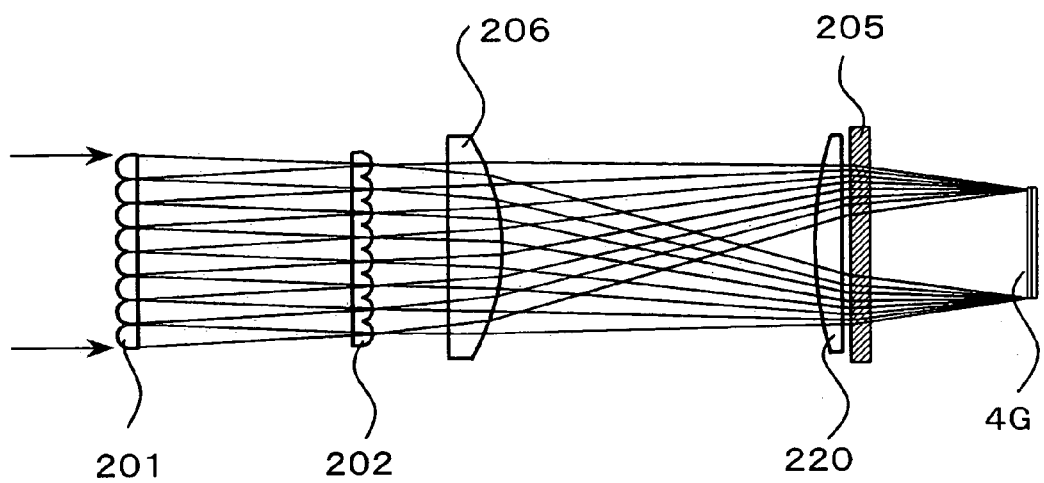
FIG. 9 is an explanatory view for describing the operation of an illumination-optics unit of Embodiment 2, uniformly illuminating a liquid crystal light valve.

FIG. 9 is an explanatory view illustrating the uniform illumination operation by an illumination-optics unit, and the case with the green liquid crystal light valve 4G is represented. Additionally, only principal elements are illustrated. The field lens 220 corrects orbits of light that, after having entered the outmost periphery of the light valve 4G, would head off-mark, outside of the liquid crystal light valves 4G, so that reduction in the amount of light in the vicinity of the light valve 4G is prevented. The field lens 220 also telecentrically illuminates the liquid crystal light valve 4 (the principal rays, crossing the optical axis at the focal position of a not-illustrated illumination-optics unit, become parallel to each other). Accordingly, by arranging the grid polarizer unit 205 in a position right after the field lens 220, not only the efficiency of polarization-selection transmission is raised, but the thermal burden is lightened thanks to the small energy density of the incident light.

Moreover, as illustrated in FIG. 9, since illumination beams become thin at the position right after the field lens 220 in accordance with the size of the liquid crystal light valves 4G, the effective area of the grid polarizer 2050 of the grid polarizer unit 205 can be curtailed, which brings about an advantage in reducing cost. For the same reason, the grid polarizer unit 205 may be arranged in a position right before the field lens 220; still, since light behaves telecentrically in a position right after the field lens 220, the grid polarizer unit 205 is preferably arranged at a position right after the field lens 220, from the viewpoint of obtaining a uniform effect over the whole effective area.

Although the case with a mercury-lighting-based lamp is illustrated in FIG. 8, lamps with broad emission-wavelength characteristics such as a halogen lamp and a xenon lamp are superior to mercury-lighting-based lamps in terms of reproducibility of light of red colors. In this case, the same effect can be obtained by arranging the grid polarizer unit 205 in the path of red light instead of green. Various application examples of the arrangement and number of the grid polarizer units 205 are conceivable depending on the constitution of the color-separation/color-composition system 21, the number of the liquid crystal light valves, and the combination of these. For example, by arranging one each of the grid polarizer unit 205 in each of the light paths of the three colors, i.e., red, green and blue, dimming adjustment can be carried out either by controlling each color in an integrative way that the colors are in interrelationship with each other, or by controlling each color independently from the other. As for the number of the grid polarizer units 205 to be arranged, an appropriate number can be chosen by taking cost and other conditions for the arrangement, besides the type of light source, into account.

In addition, with the grid polarizer unit 205, irrespective of the wavebands of incident light, the same effect can be obtained for any color of light within the visible light region. In fact, although the polarization-transmittance differs according to wavelength, the brightness and color design of a projection-type display apparatus are not affected by wavelength.

Embodiment 3

Figure 10:
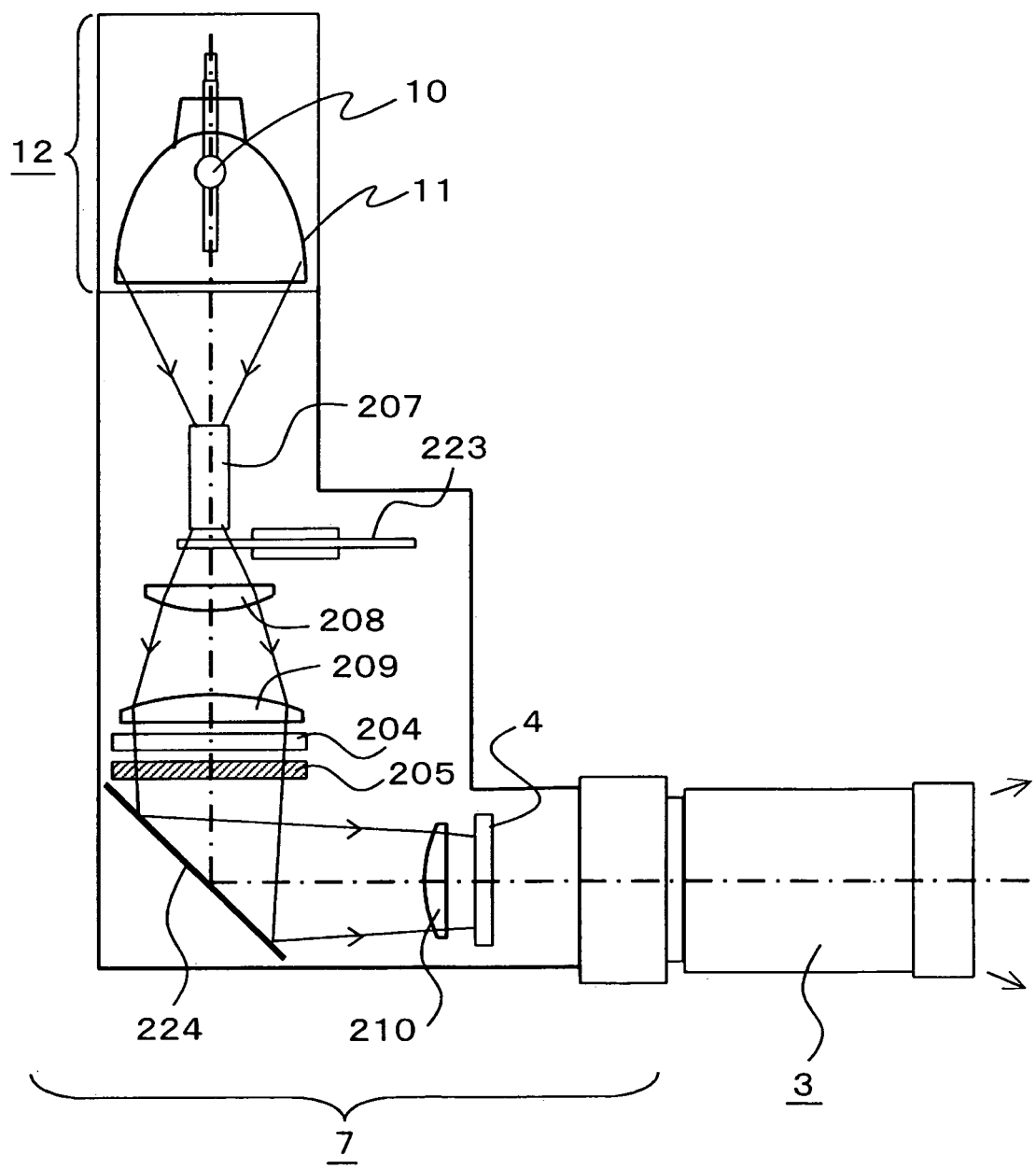
FIG. 10 is a plan view schematically illustrating the constitution of an optical system of a projection-type display apparatus involving Embodiment 3.

FIG. 10 illustrates a particular constitution of a projection-type display apparatus according to Embodiment 3. In Embodiment 3, what is distinguished from Embodiments 1 and 2 is the fact that the integrator-optics system includes a different illumination-optics unit 7. The illumination-optics unit 7 includes a light source unit 12 that emits convergent beams and forms a condensed light spot in a predetermined position; a light guide 207 that has its incident end in the vicinity of the condensed light spot, and approximately uniformizes the intensity distribution of the condensed light spot in the vicinity of its emitting end; and a lens system that puts the emitting end of the light guide 207 in optically conjugate relationship with the liquid crystal light valve 4. The lens system, including condenser lenses 208 and 209, and the field lens 210, efficiently transmits light from the emitting end of the light guide 207, to uniformly illuminate the liquid crystal light valve 4. The polarization-conversion element array 204 is arranged in a position right after the condenser lens 209, and the grid polarizer unit 205 immediately follows the polarization-conversion element array 204. A reflection mirror 224 appropriately deflects the light path so that constituent elements of the illumination-optics unit 7 are arranged compactly. The light modulated by the liquid crystal light valve 4 is projected onto an not-illustrated screen through the projection lens 3.

Convergent light from the light source 12 may be formed either by a well-known ellipsoidal mirror or by the foregoing parabolic mirror combined with a condenser lens. At any rate, a condensed light spot, (the intensity distribution of) which is for the most part determined by the specifications for the light source unit 12, is formed in the vicinity of the incident end of the light guide 207. Since this condensed spot has a spindle-shaped intensity distribution, such as a Gaussian distribution, and is not suitable for uniformly illuminating the liquid crystal light valve 4, the light guide 207 is put in place. The light guide 207 is for creating divergent beams, which have uniform intensity distribution, at its emitting end by transmitting light rays entering the incident end, reflecting the rays off its inner walls (mainly its side faces); and the type that has a reflecting surface made of a metal thin membrane on its bore inner surface, e.g., a rod made of glass or an inner-face mirror type formed into a pipe-shape, is well known. The light guide 207 is a component which basically has both an incident end and an emitting end, and sides which connect these ends. In addition, a type, as illustrated in FIG. 10, which is columnar and the sides of which are perpendicular to the incident end as well as the emitting end, is typical as a light guide 207. In fact, by choosing appropriate end-face shapes and length, taking the size and angular components of the condensed light spot into account, the divergent beams from the emitting end can be utilized as a uniform illumination light source. It is preferable, in terms of light utilization efficiency, to make the shape of the emitting end of the light guide 207 approximately analogous to that of the liquid crystal light valve 4 as the illuminated surface. For instance, when the shape of the effective area of the liquid crystal light valve 4 is rectangular, that of the emitting end of the light guide 207 may preferably be rectangular. Moreover, the length of the light guide 207 in its extending direction may be determined in such a way that just that number of reflections necessary to realize uniformity in the intensity distribution of the emitted light can be ensured, and is typically set approximately to the length at which the light guide 207 causes several reflections.

Figure 11:
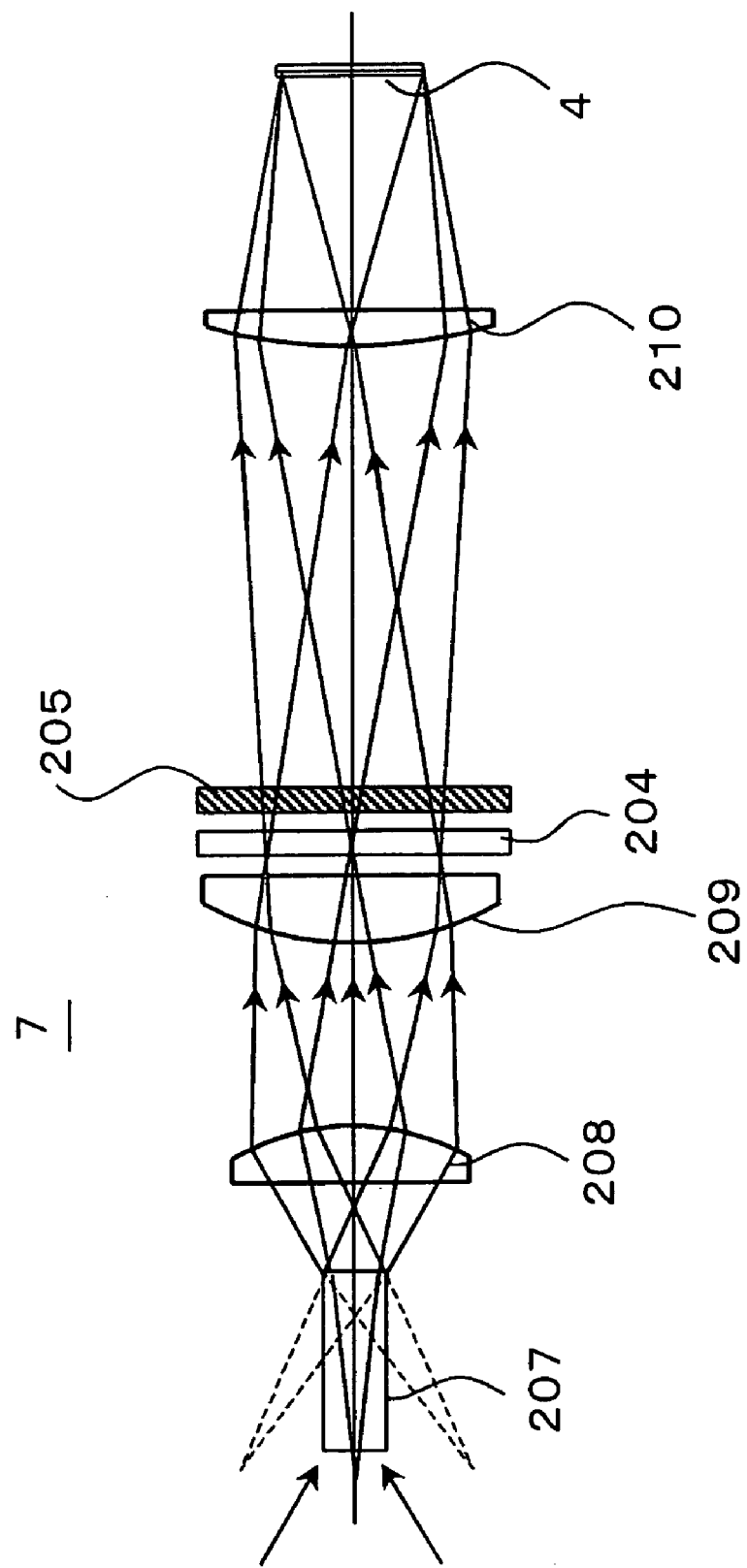
FIG. 11 is an explanatory view for describing the operation of an illumination-optics unit of Embodiment 3, uniformly illuminating a liquid crystal light valve.
Figure 12:
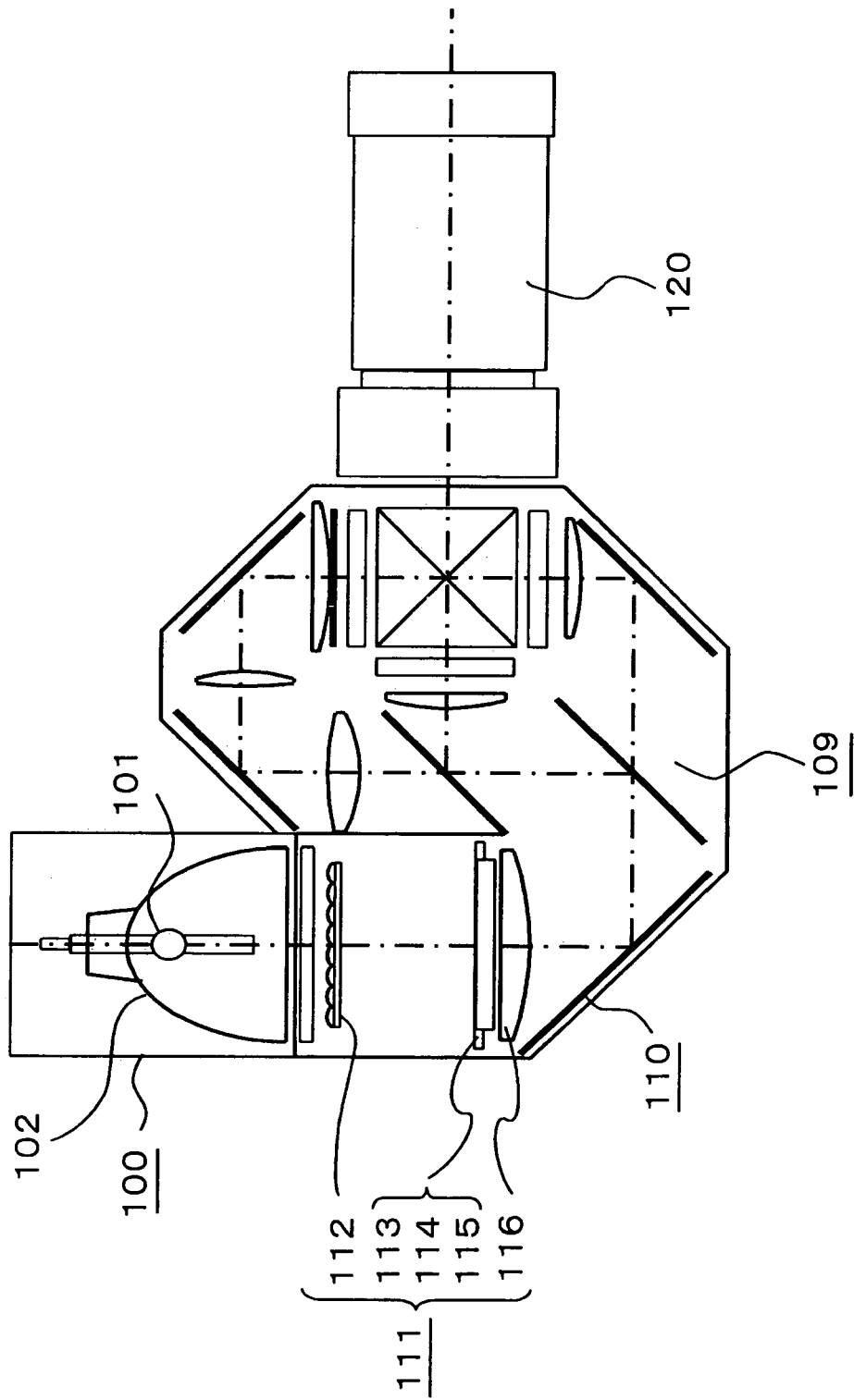
FIG. 12 is a plan view schematically illustrating the constitution of an optical system of a projector according to Patent Documents 1 and 2.
Figure 13:
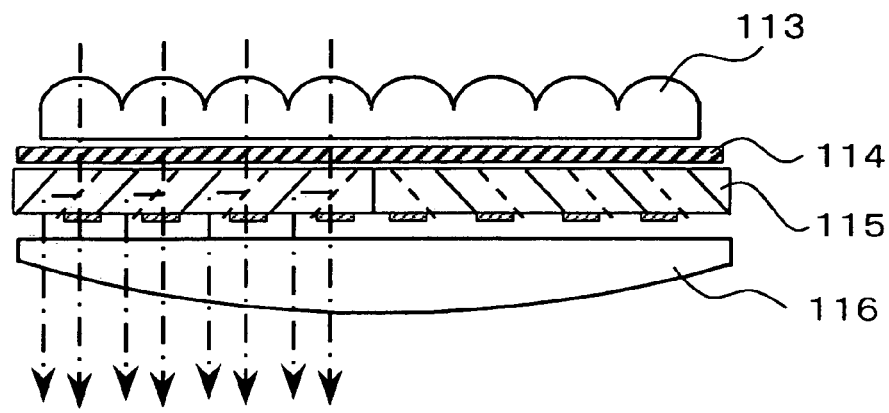
FIG. 13 is a magnified schematic view of a second lens array, a light shade, a polarization-conversion element and a superposition lens according to Patent Documents 1 and 2.
Figure 14:
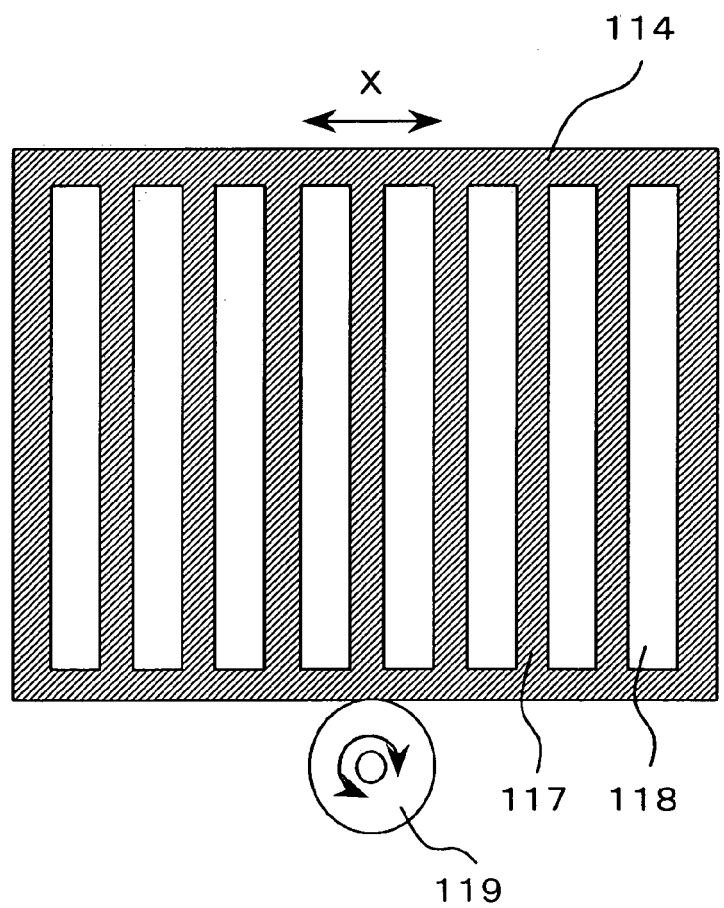
FIG. 14 is a view for describing the operation of the light shade according to Patent Documents 1 and 2.
Figure 15A:
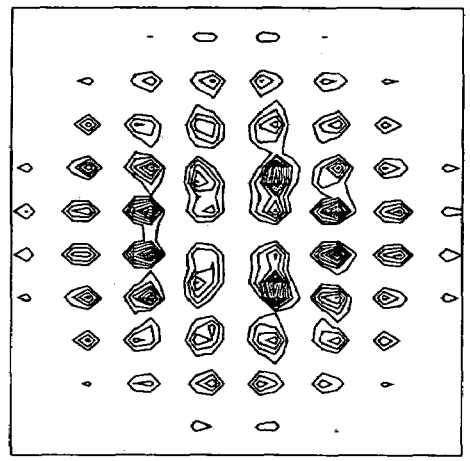
FIG. 15 is a view representing simulated-data of arc images of a light source in an illumination-optics unit under the inventors' experiment.
Figure 15B:
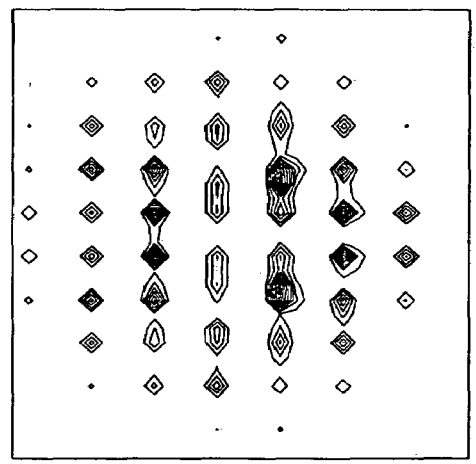
Figure 15C:
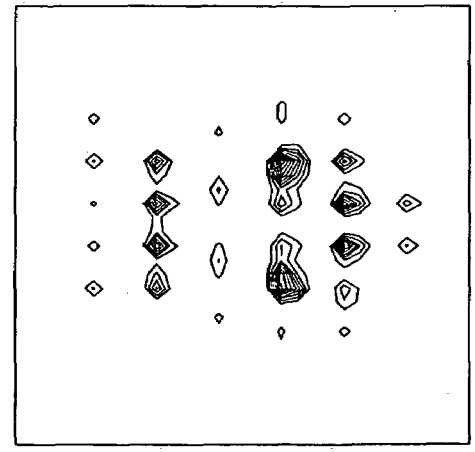
Figure 16:
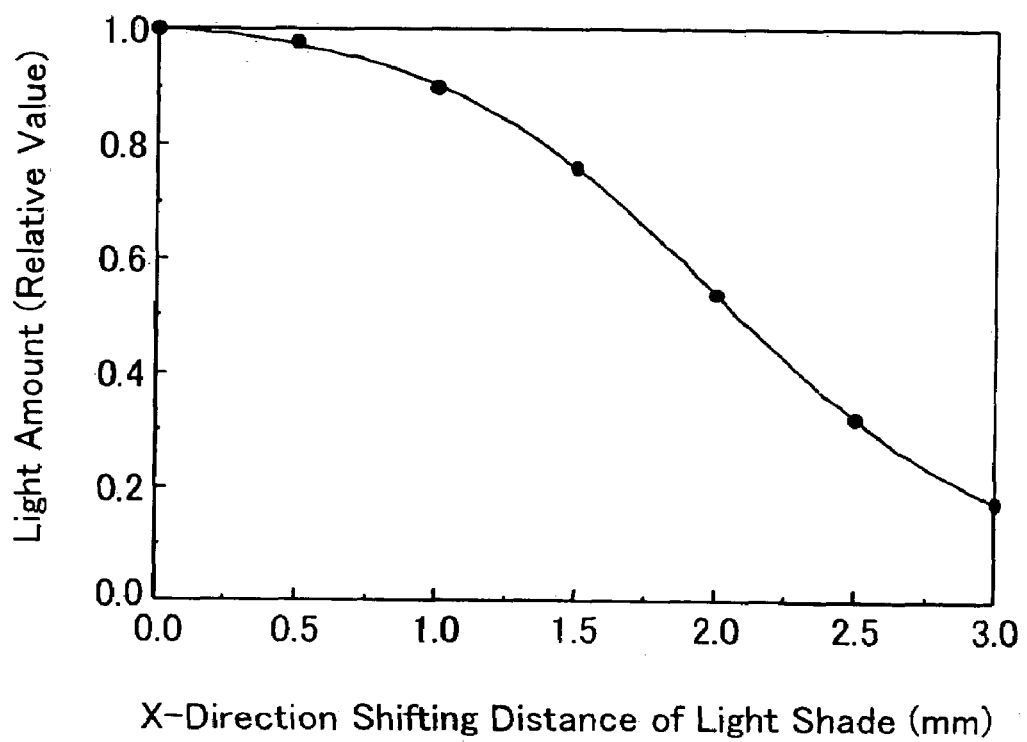
FIG. 16 is a graph plotting computer-simulated data for a relationship between X-direction shifting distance of the light shade and change in the amount of light under the inventors' experiment.

FIG. 11 schematically represents a basic constitution of the illumination-optics unit 7, and arrows in the figure schematically illustrate behavior of light. As illustrated in FIG. 11, light emitted from the emitting end of the light guide 207 is approximately condensed onto the polarization-conversion element array 204 by the lens action of the condenser lenses 208 and 209. The condensing points is in particular created through image re-formation, by the lens action of the condenser lenses 208 and 209, of the actual light source that is located in the vicinity of the incident end of the light guide 207, and of a virtual light source that is located in a position that is reached by tracing the dotted-line imaginary paths back toward the light source unit 12. Although such light source images show spatial distribution very similar to the light source images illustrated in FIG. 15A, they differ from light source images formed using the first lens array 201 and the second lens array 202, described in Embodiments 1 and 2, that form light source images in light paths by acting on approximately parallel beams, from the viewpoint that the more apart are micro-light source images from the optical axis of the condenser lenses 208 and 209, the larger becomes the incident angle, on the light guide 207, of light that forms the micro-light source images. This, however, is the same as the fact that orientating the polarization planes of light into a single direction can efficiently be carried out by arranging the polarization-conversion element array 204 in the position where light emitted from the emitting end of the light guide 207 is approximately condensed through the lens action of the condenser lenses 208 and 209.

It is for the same reason, set forth in the foregoing embodiments, that the grid polarizer unit 205 in this embodiment is preferably arranged in a position where the uniformity of illumination in the illumination-optics unit 7 is scarcely affected. Since designing so that the incident angle of light with respect to the optical axis that passes through the condenser lens 209 is approximately 10 degrees is possible, when the grid polarizer unit 205 is arranged in a position right after the polarization-conversion element array 204, efficient dimming effect without spoiling the illumination uniformity of the lens system can be obtained. Additionally, the structure and driving method for the grid polarizer unit 205 described in Embodiment 1 can also be applied hereto.

A pivotal color filter 223 generates each of colors red, green and blue. The pivotal color filter 223 is a kind of saucer-shaped color separator, in which sector-like color filters are arranged. The pivotal color filter 223, amidst which a motor is arranged, can be pivoted by the motor at a predetermined speed. This is optimal for time-sequentially colorizing images from projection-type display apparatuses having one valve, and in this case, since only a single liquid crystal light valve 4 is required, the projection-type display apparatuses can be made compact. UNAXIS (Unaxis Balzers Ltd. Division Optics) and OCLI (Optical Coating Laboratories, Inc.) are especially known suppliers of such pivoting color filters.

Besides, color-sequential systems that use liquid crystal light valves are also known and may be used therein. When two or more liquid crystal light valves are used to constitute projection-type display apparatuses, it goes without saying that employing the foregoing color-separation/color-composition system 21 instead of the pivotal color filter 223 is feasible.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A projection-type display apparatus comprising:
   a light source;
   a liquid crystal light valve for modulating light emitted from the light source by turning a light polarization plane of the light;
   a projection lens for projecting the light modulated by the liquid crystal light valve onto a projection surface;
   a pivotable light polarizer arranged between the light source and the liquid crystal light valve; and
   a drive control unit for pivoting the pivotable polarizer with respect to the light axis,
   wherein the pivotable polarizer adjusts the intensity of a polarization component according to a pivotal angle.

2. A projection-type display apparatus as recited in claim 1, further comprising a polarization-conversion element arranged between the light source and the light polarizer, for emitting light after orientating the polarization plane of the light emitted from the light source into a single direction.

3. A projection-type display apparatus as recited in claim 2, further comprising:
   a first lens array including a plurality of lenses, arranged between the light source and the polarization-conversion element, for splitting light emitted from the light source into a plurality of partial beams; and
   a second lens array including a plurality of lenses, arranged between the first lens and the polarization-conversion element, for approximately condensing onto the polarization-conversion element for the plurality of partial beams split by the first lens array.

4. A projection-type display apparatus as recited in claim 2, wherein the light polarizer is arranged in the vicinity of the polarization-conversion element.

5. A projection-type display apparatus as recited in claim 2, further comprising:
   a light guide, arranged between the light source and the polarization-conversion element, having an incident end for receiving light emitted from the light source, and an emitting end for emitting the light as a planar light source; and
   a lens system, arranged between the light guide and the polarization-conversion element, for approximately condensing onto the polarization-conversion element light emitted from the emitting end of the light guide.

6. A projection-type display apparatus as recited in claim 5, the light guide is columnar.

7. A projection-type display apparatus as recited in claim 5, the light guide is rectangular.

8. A projection-type display apparatus as recited in claim 1, further comprising:
   a polarizer driving unit for driving the light polarizer;
   an average-value detector for detecting from an input image signal, and outputting to the polarizer driving unit, average luminance value in a frame;
   a peak-luminance detector for detecting from said input image signal, and outputting to the polarizer driving unit, peak luminance value in said frame;

a liquid crystal driving unit for driving the liquid crystal light valve; and a determination unit for determining from said average and said peak luminance values frame-by-frame whether to alter luminance value, and outputting the determination results to the liquid crystal driving unit;

wherein the polarizer driving unit determines pivotal angle for and drives the light polarizer based on said average and said peak luminance values, and the liquid crystal driving unit drives the liquid crystal light valve based on said determination results.

9. A projection-type display apparatus as recited in claim 1, the light source comprising a light source unit, wherein the light source unit includes a lamp and a concave mirror, wherein the lamp is a halogen lamp, a xenon lamp, a metal halide lamp, or a ultra-high pressure mercury lamp, wherein the concave mirror or a ellipsoidal mirror.

10. A projection-type display apparatus as recited in claim 1, wherein the light polarizer is a grid polarizer comprising a base material made of a dielectric in parallel-plate form, and a plurality of thin linear elements arranged on the surface of the base material at a predetermined spacing from each other.

11. A projection-type display apparatus as recited in claim 1 further comprising, a color separator arranged between the light source and the liquid crystal display light valve, for trichromatically separating light from the light source into red, green and blue light; and wherein the pivotable polarizer is provided between the light source and the color separator.

12. A projection-type display apparatus as recited in claim 1, wherein the pivotable light polarizer is a transmission-type polarizer or a deflection polarizer.

13. A projection-type display apparatus as recited in claim 1 wherein the pivotable polarizer adjusts the intensity of S-polarization component or the intensity of P-polarization component according to the pivotal angle.

14. A projection-type display apparatus as recited in claim 1, further comprising:

a color separator arranged between the light source and the liquid crystal light valve, for trichromatically separating light from the light source into red, green and blue light; and a color composition unit arranged between the liquid crystal light valve and the projection lens, for composing the three colors of light modulated by the liquid crystal light valve;

wherein the light polarizer is arranged between the color separator and the liquid crystal light valve in a light path of at least one of the three colors of light emitted from the color separator.

15. A projection-type display apparatus as recited in claim 14, wherein the light source is a mercury-lighting based lamp, and wherein the pivotable polarizer is arranged in a light path of the green light.

16. A projection-type display apparatus as recited in claim 1, wherein the pivotal angle is zero when the intensity is maximum, and wherein the pivotable polarizer has a characteristic such that the intensity decrease in proportion to $\cos \theta$, where $\theta$ is the pivotal angle.

* * * * *